Dec. 3, 1963  P. T. ROBERTS  3,112,779
PEELING MACHINE
Filed June 19, 1962  4 Sheets-Sheet 1

INVENTOR.
Paul T. Roberts,
BY
Lockwood, Woodard, Smith & Weikart
Attorneys.

INVENTOR.
Paul T. Roberts,
BY
Lockwood, Woodard, Smith & Weikart
Attorneys.

Dec. 3, 1963   P. T. ROBERTS   3,112,779
PEELING MACHINE
Filed June 19, 1962   4 Sheets-Sheet 4

INVENTOR.
Paul T. Roberts,
BY
Lockwood, Woodard, Smith & Weikart
Attorneys.

3,112,779
Patented Dec. 3, 1963

3,112,779
PEELING MACHINE
Paul T. Roberts, 4910 Park Ave., Indianapolis, Ind.
Filed June 19, 1962, Ser. No. 203,501
7 Claims. (Cl. 146—43)

This invention relates generally to improved means for removing the skin or peel of a fruit or vegetable and more particularly to a machine for removing the peel of a fruit or vegetable wherein the peel is quite thin, such as for an example in the case of a tomato.

While a number of machines have been invented for peeling tomatoes, yet it is still common to find the peeling operation being performed by hand, a factor which has a significant influence on tomato canning operations. A number of reasons may be advanced for the failure of industry to use machinery exclusively for the peeling operation. Suffice here is to mention that previous machinery has usually been quite complex, unreliable, difficult to maintain, inflexible, and difficult to keep clean.

It is, therefore, a general object of the present invention to provide an improved peeling machine.

It is a further object to provide a peeling machine which is simple and durable in construction, easily adapted to incorporation in existing conventional production lines of canning and food processing plants, and easy to maintain and to keep clean.

Other objects and advantages of the invention will become apparent as the description proceeds.

Described briefly, a typical embodiment of the present invention incorporates an elongate slider plate mounted thereon to receive tomatoes from the end of a conveyor belt which feeds blanched tomatoes, with the stem end down, to the peeling machine from a suitable source. At each side of the slider plate is a conveyor belt moving in a vertical plane and in a horizontal direction whereby a tomato introduced from the inbound conveyor may be embraced between the two belts moving in a vertical plane. The tomato is thereby moved along the slider plate.

A slitter knife is disposed above the slider plate and located over the space between the facing portions of the two belts. Thus, as the tomato is moved along the slider plate the slitter knife slits the skin at the blossom end of the tomato, the stem end being down as the tomatoes are fed into the peeling machine.

One of the two transport belts is terminated short of the length of the other belt and beyond this termination is a peeler belt which is an endless belt having a portion moving in a vertical plane downwardly toward the slider plate.

As the tomato is moved past the end of the short one of the transport belts, lateral support on one side is provided by a gap plate, and the tomato begins to rotate by virtue of the force being applied by the longer of the two transport belts. As the tomato comes into contact with the peeler belt, the peeler belt begins to remove the skin of the tomato. Skin removal is completed upon one complete revolution of the tomato about the vertical axis as it is moved along the slider plate by the second transport belt. Upon completion of the peeling operation, the second transport belt moves the tomato off the end of the slider plate whereupon it is picked up by a take-off conveyor for transportation to a coring station.

The full nature of the invention will be understood from the accompanying drawings and the following description and claims:

Figure 1:
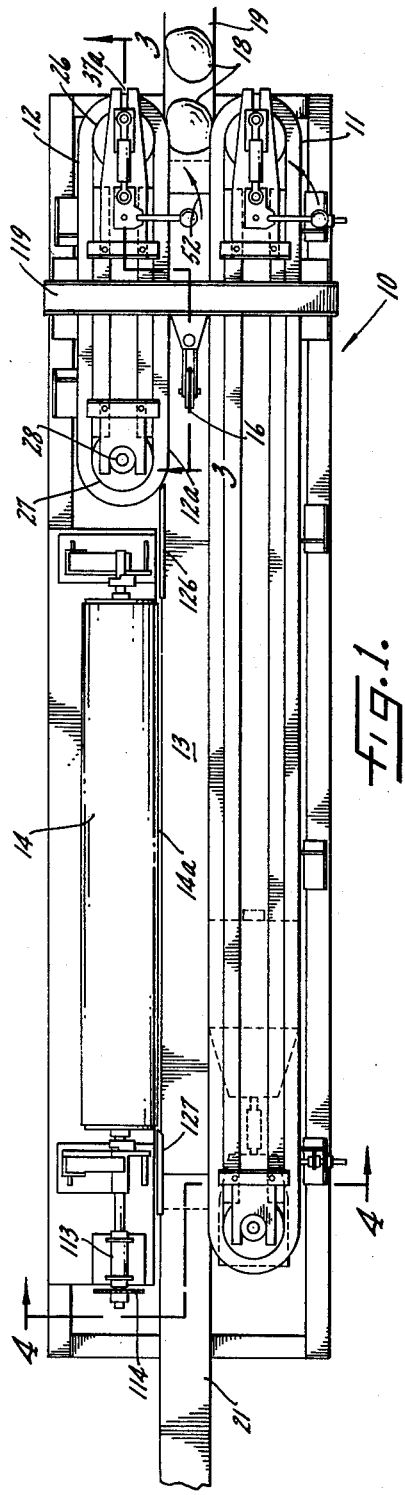
FIG. 1 is a top plan view of a typical embodiment of the present invention.
Figure 2:
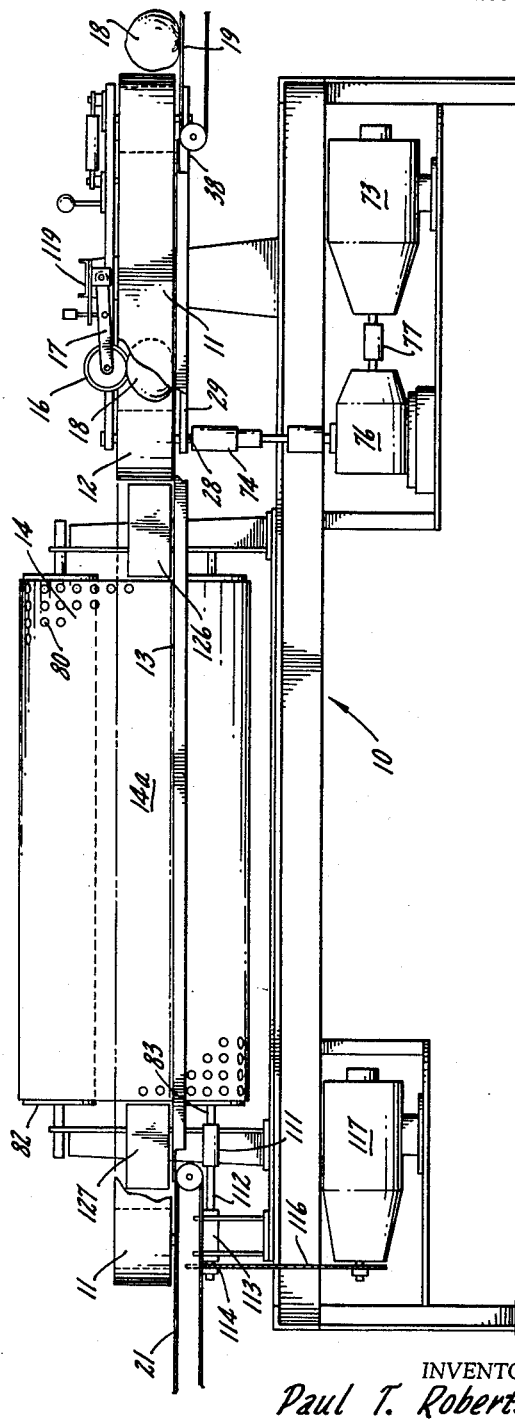
FIG. 2 is an elevation of the typical embodiment of the invention, with some portions being broken away to illustrate certain details.

Referring to the drawings, the peeling machine includes a bed frame 10 which may be of any suitable sturdy construction and employs adjustable legs whereby the working height of the machine can be suited to the particular installation and operating conditions desired. First and second transport belts 11 and 12, respectively, are mounted adjacent to and slightly above the elongate slider plate 13 which extends the length of the machine and is secured by suitable supports to the bed frame. A peeler belt 14 is mounted beyond the end of the first belt 12 and moves in a vertical plane with the portion facing the first belt 11 moving vertically downwardly. A circular slitter knife 16 is mounted at the end of the arm 17 pivotally mounted to suitable support means secured to the bed frame 10.

Tomatoes 18 fed to the right-hand end of the peeling machine by means of the inbound conveyor 19 can thereby be engaged by the conveyor belts 11 and 12 and moved forward to the left along the slider plate into position where the end is cut by the slitter knife, and then moved to a position opposite the peeler belt and moved therealong for the peeling operation by the peeling belt. After departure of the tomato from the peeler belt, the first transport belt 11 continues to move the tomato to the left-hand end of the peeling machine, whereupon it may be removed by the take-off conveyor 21.

The belts 11 and 12 are usually alike in all respects with the exception of their length. Therefore, the description of one will suffice for both. The belt itself is usually made of polyurethane foam approximately ¾ inch thick, though other materials may also be found satisfactory. One example of a suitable firmness is 20 to 22 pounds on the RMA (Rubber Manufacturers Association) scale. The belt is carried between a pair of crowned pulleys 26 and 27. It should be understood, of course, that presently known foam materials have an inadequate tensile strength in and of themselves to serve as a belt and, therefore, would be employed as a facing material for a material such as neoprene or neoprene-cord combination used as a base.

Pulley 27 is mounted on a drive shaft 28 supported by suitable bearings in the mounts which are secured to the transport belt frame members 33 and 34. The rear pulleys 26 are mounted by bearings to the shaft 36 supported by the plates 37 and 38 which are also secured to the belt frame members 33 and 34. It will be observed that each of the plates 37 and 38 has a longitudinal slot 37a and 38a at the right-hand end thereof in which the shaft 36 is disposed.

Appropriate belt tension is provided by means of the following components. The shaft 41 extends through apertures in the plates 37 and 38 and has mounted to the top and bottom ends thereof block 42. The upper block 42 has a handle 43 secured thereto with a knob 44 at the end thereof. The upper and lower blocks 42 have a pin 46 secured thereto to which the left-hand end of a turnbuckle assembly 47 is mounted. The right-hand end of the turnbuckle assembly 47 is mounted to the shaft or pin 48 which is in turn secured to the shaft support block 49 to which the shaft 36 is secured. The pin 48 extends through the block 49 and into the slot 37a and 38a whereby alignment of the block 49 is always maintained by virtue of cooperation of the shaft 36 and the shaft or pin 48 in the slots 37a and 38a. Appropriate tension can be obtained by turning the turnbuckle connector 51. The tension can be immediately released for removal of the belt by moving the knob 44 in the direction indicated by the arrow 52. Thus, it is seen that the belt may be readily removed from the pulleys for cleaning or replacement purposes.

Upper and lower guide rails 53 and 54, respectively, extend a substantial portion of the length of each run of a belt and are secured to the upper and lower plates 37 and 38, respectively, by the rail support brackets 56 and 57, respectively.

It will be noted that a plurality of support bars 58 having corners rounded as at 59 are secured to the neoprene backing or base of the belt. These bars are usually made of nylon and are provided to engage the upper face 54a of the lower belt guide rails at points intermediate the pulleys, particularly on the long belt 11, to thereby support the belt vertically as it moves along. Of course, the members 33 and 34 provide backing support for the belts.

To accommodate lateral movement of the belt with respect to the bed frame of the machine whereby various spacings between the inner facing portions of the belt can be obtained to handle different sizes of tomatoes, blocks 61 are mounted to the lower face 62 of the plates 38 and 29 by means of the shoulder screws 63.

The block 61 has a generally L-shaped recess 64 therein whereby it is mounted to the L-shaped flange 66 of the support 67 which is secured to the bed frame 10. The recess 64, including the slot 68 therein, thereby provides support for the belt frame and accommodates lateral movement thereof for movement thereof transverse to the direction of motion of the belt faces whereby the spacing between the transport belts can be varied. To facilitate the variation of spacing between the belts, a crank operated screw 69 has threads 71 at the end thereof opposite the crank 72, which screw threads are threadedly engaged in the blocks 61. Accordingly, rotation of the screw 69 by means of the crank 72 adjusts the position of the belt.

A variable speed drive for the belt 12 may be provided by the motor-drive unit 73 mounted to the bed frame and driving the shaft 28 by means of suitable universal joints 74 and the 90 degree gear box 76 connected to the output of unit 73 by the coupling 77. The drive for the belt 11 may be obtained in like manner.

Figure 4:
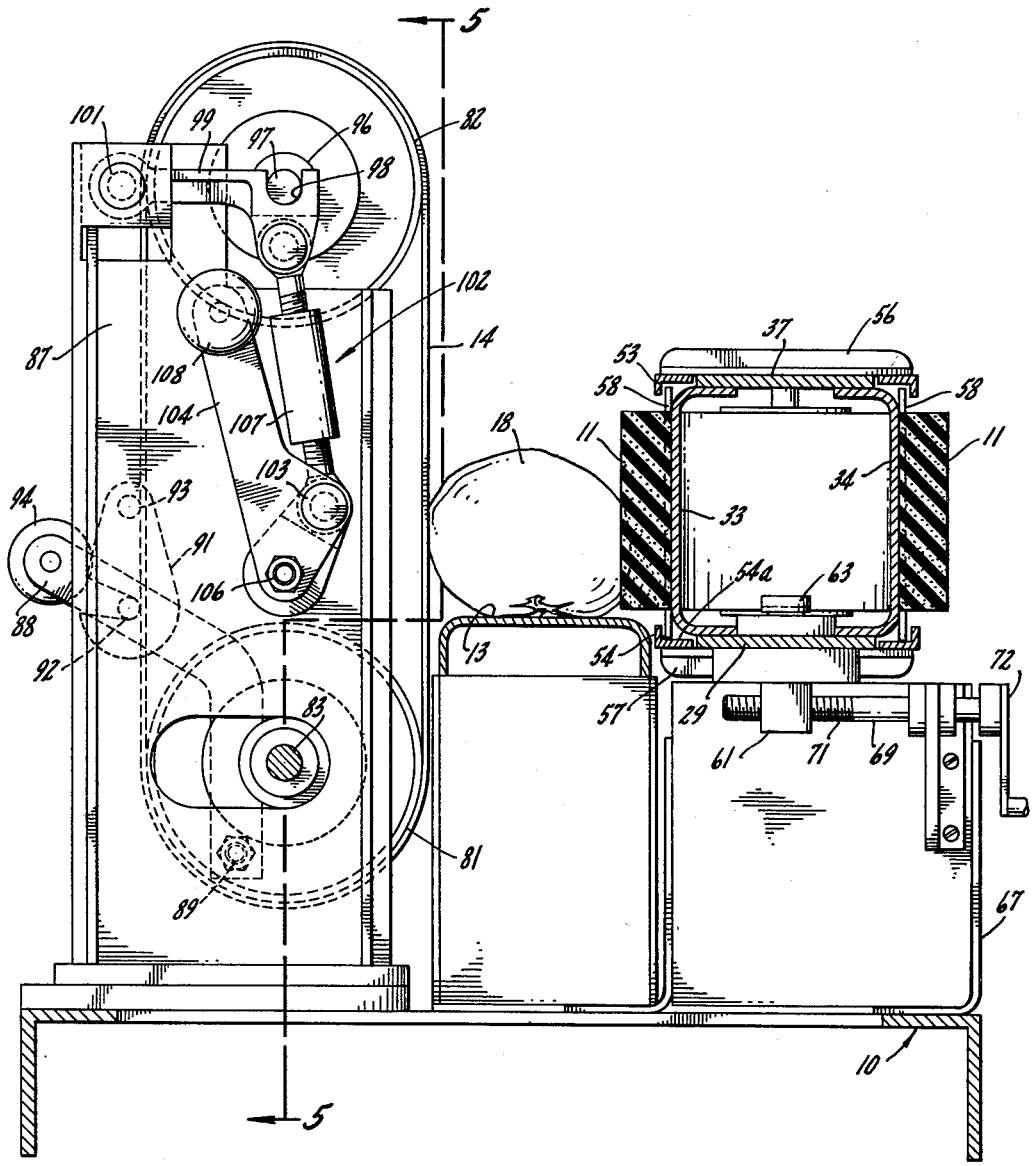
FIG. 4 is an end view, partly in section, illustrating further details of the typical embodiment of FIG. 1, with a tomato engaged by the peeler belt, the slitter knife being omitted for clarity of illustration.
Figure 5:
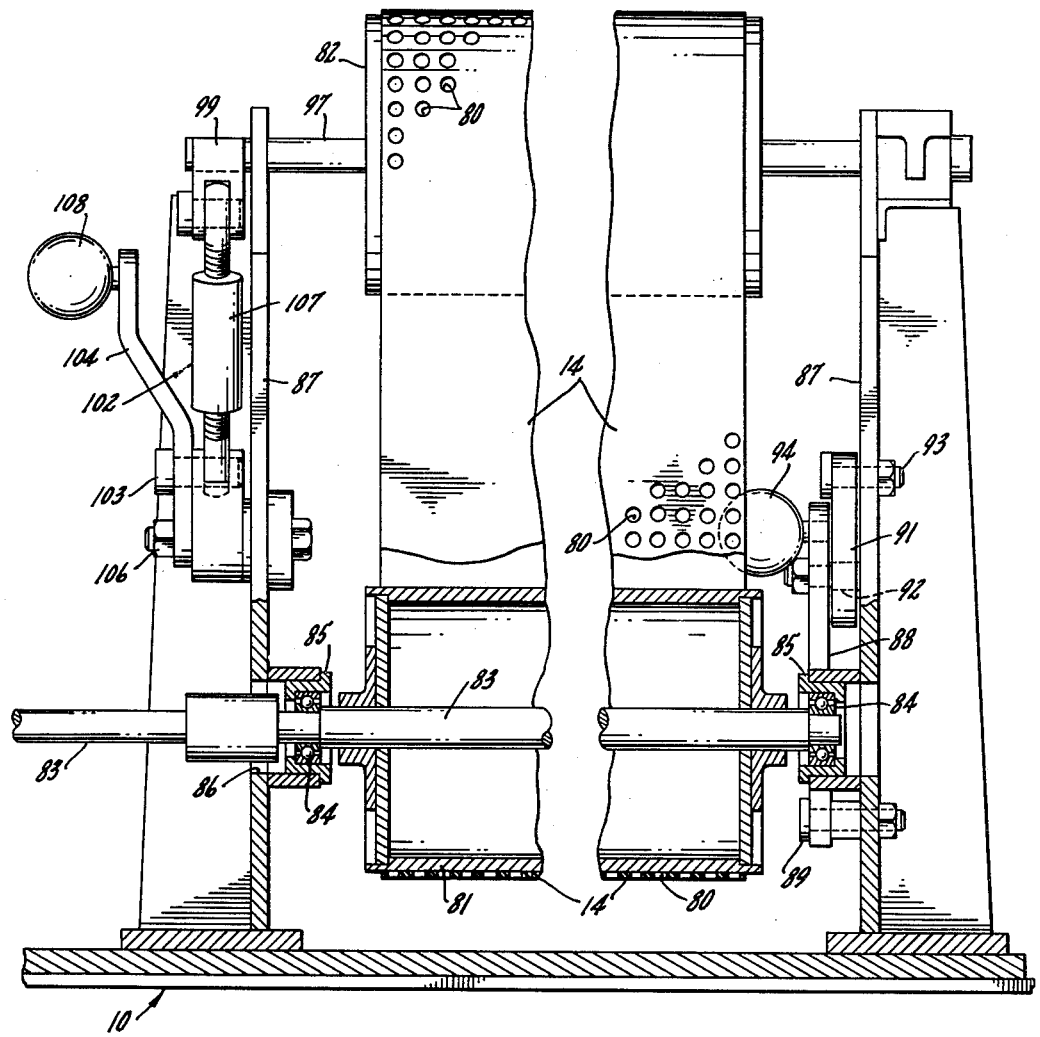
FIG. 5 is an enlarged section taken along the line 5—5 in FIG. 4 illustrating mounting details of the lower peeler belt roller.

Peeler belt 14 is normally made of neoprene about 1/32 inch thick. It is also perforated as at 80 to improve the skin gripping characteristics thereof. The belt is carried by the crowned rollers or pulleys 81 and 82. The lower roller 81 is mounted on a shaft 83 which is carried by bearings 84 in bearing retainer 85 which is mounted in the slot 86. Details of this construction are readily apparent in FIG. 5. The slot 86, of course, is provided in a support 87 secured to the bed frame 10. The bearing retainer 85 is held in the position shown in FIG. 4 by means of the retainer bar 88 which is pivotally mounted at 89 to the support 87, and which is locked in the position shown by the latch 91 engaging the retainer arm pin 92. Upon release of the latch 91 by pivoting about its pivot 93, the arm 88 may be lowered by pulling down on the knob 94 whereupon the bearing retainers 85 are loosened and can be slid freely in the slot 86.

The upper roller 82 is mounted by bearings 96 to the shaft 97. The shaft 97 is supported in the notch 98 in the arm 99 pivotally mounted at 101 to the support 87. Support for the arm 99 below the shaft 97 is provided by the turnbuckle assembly 102, the lower end of which is pivotally mounted at 103 to the crank arm 104 which is pivotally mounted to the support 87 at the pin 106. A suitable adjustment of belt tension can be provided by turning the turnbuckle connectors 107 at each end of the belt. Quick release of the belt and rollers can be provided by pulling down the knob 108 connected to the arm 104 whereupon the upper roller may be removed from the notches 98 and the belt thereupon becomes completely slack. By pulling down the knob 94 the lower shaft bearing retainers are loosened and by cocking the shaft in the slots 86 the lower roller can be removed from the supports 87. Thus, the entire assembly can be quickly removed for cleaning purposes.

With regard to the materials of construction of the peeler belt rollers as well as the transport belt rollers, the surface thereof over which the belts operate may be made of stainless steel, though it may be found desirable to use another material, such as aluminum or magnesium coated with an inert plastic, for example.

The drive for the peeler belt shaft 83 is provided through the coupling 111 from the shaft 112 carried in the bearings 113. This shaft is driven by the pulley 114, belt 116 and variable drive 117. The slitter knife 16 is a circular steel blade. In several of the figures, the knife is shown in cutting relation to a tomato. The blade is mounted for rotation in the arm 17 though in operation of the machine the nut 16a is tightened to prevent rotation. The arm 17 is pivotally mounted at 118 to the slitter knife support cross-member 119 which is mounted to the bed frame 10. Thus the knife is free to move through a substantial arc to accommodate different sizes of tomatoes.

At each side of the blade is a disc 16d which supports the blade on the tomato as the tomato passes under it. In this manner, the depth of cut by the blade is limited, whereas otherwise the cut could be of substantial depth because of the arc through which the arm 17 can travel.

Figure 3:
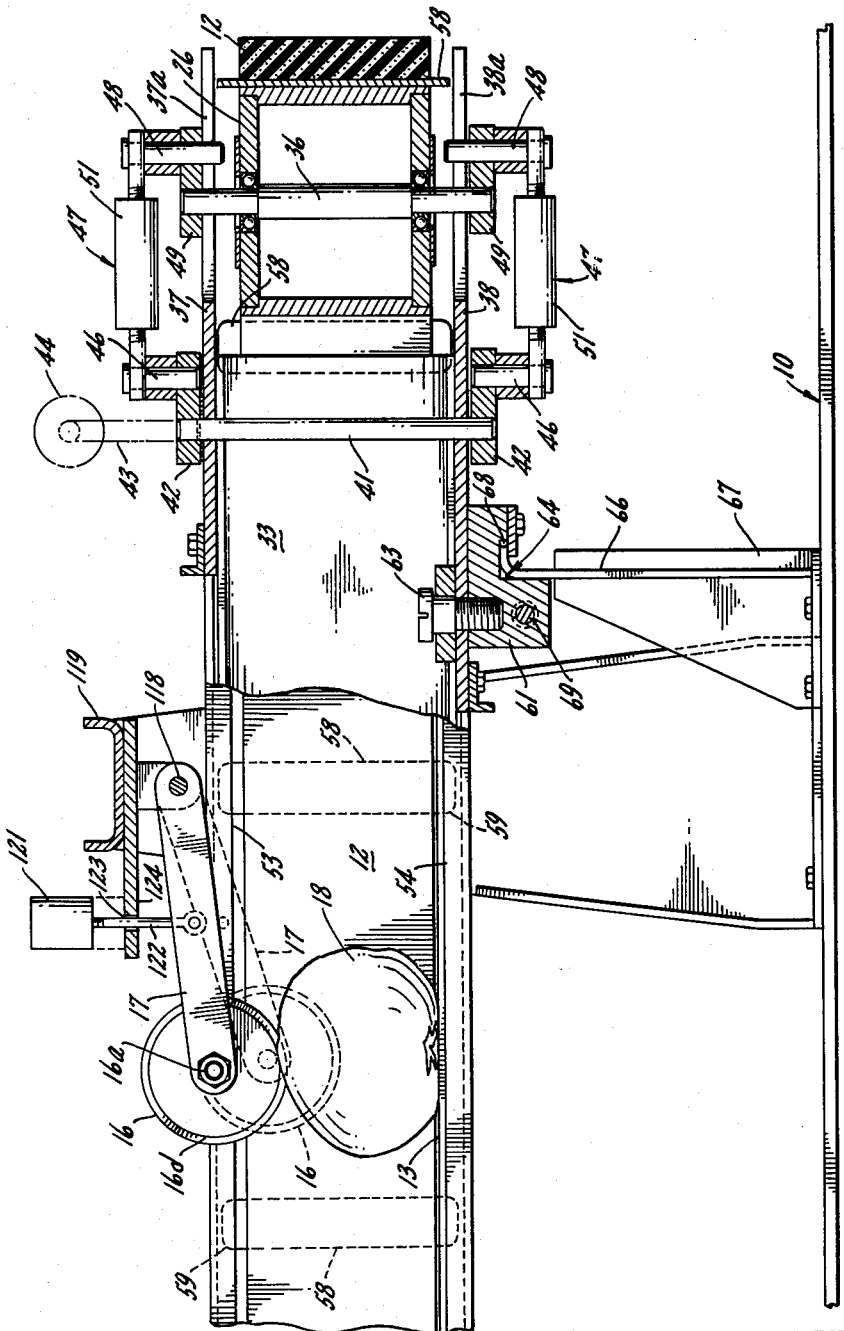
FIG. 3 is an enlarged section taken along the line 3—3 of FIG. 1, illustrating further details of the typical embodiment.

A suitable weight 121 is threadedly received on the rod 122. The rod passes through an aperture 123 in the plate 124 whereby it is guided and retained in position above the arm 17 and whereby the weight can function to limit descent of the arm upon coming to rest on the plate 124. The location of the weight is typically adjusted to limit the descent of the lower edge of the knife to a point approximately one and one-half inches above the slider plate. This is indicated by the dotted outline in FIG. 3. The size of the weight can be changed as required by the skin strength of the tomatoes being peeled.

The slider plate is typically made of stainless steel though other materials unaffected by the acid of the tomato may also be used. The plate is flat and smooth on the top.

A vertical gap plate 126 is provided between the end of the belt 12 and the edge of the peeler belt 14. It can thereby function to support a tomato against the inner face 11a of the belt 11 during movement of the tomato by the belt 11 from the forward end of the inside face 12a of belt 12 to the inside face 14a of the peeler belt 14. A similar gap plate 127 is provided at the forward edge of the peeler belt and facing the inside face of belt 11 whereby the peeled tomato departing from the peeler belt is held against belt 11 until it is discharged onto the take-off conveyor 21.

*Operation*

In the operation of the present invention, it should be understood that prior to delivery to the peeling machine by the inbound conveyor 19, the tomatoes are blanched and assorted according to size by equipment for these purposes which is well known in the art. The tomatoes are then loaded on the inbound conveyor with the blossom end up and the stem end resting on the conveyor. Therefore, when they are picked up by the belts 11 and 12 which have been adjusted to provide a spacing suitable for the type of tomato being processed, they are moved along the slider plate 13 with the blossom end up. The front and rear driver belts 11 and 12, respectively, travel at the same speed as each other but faster than the inbound conveyor belts. The facing of the driver belts with a suitable resilient material such as, for example, the polyurethane foam mentioned above, enables the belts to enfold the tomatoes with a gentle pressure.

The tomatoes are propelled forward along the slider plate by the driver belts. As they are propelled forward they pass beneath the slitter knife 16 which is free to move vertically and follow the top contour of each tomato, regardless of the height of the tomato. The knife thus slits the skin on the top end with a cut only slightly deeper than skin thickness. The depth of cut by the knife is, of course, controlled by the difference in diameter between the knife blade itself and the shoulders 16d. A straight cut is made by the knife inasmuch as the tomatoes are being moved along the slider plate without rotation by virtue of the movement of the two belts 11 and 12 at the same speed.

At the forward end of the transport belt 12, the tomato is moved into contact with the gap plate 126. The location of this plate with respect to the face of belt 11 is such that the gap plate supports the tomato against the belt 11 which is thereby enabled to transport the tomato with respect to the gap plate 126 until the point of engagement with the peeler belt face 14a. Thus, as the tomato is moved along the gap plate, it can be said to rotate about a vertical axis which axis is translated parallel to the transport belt and gap plate.

When the tomatoes pass from the gap plate 126 to the front face of the peeler belt 14, the combined forward and rotary motion of the tomatoes continues inasmuch as the peeler belt's front face travels downward and in a vertical plane and, therefore, has a zero speed component parallel to the direction of motion of the inside face of the transport belt 11. However, it should be understood that the axes of the shafts supporting the peeler belt might be tilted slightly from the horizontal which would provide a positive or negative speed component in the horizontal direction.

As the translational and rotary motion of the tomatoes continues along the peeler belt, the peeler belt strips off the loose skin, the stripping being facilitated by the blanching and by the slitting. The stripping action removes the loose skin down to a small area at the stem end of the tomato which is normally removed anyway in a coring operation. The number of revolutions of the tomato while in contact with the peeler belt is governed by the length of the peeler belt. Exposure of previously peeled areas to the belt has no effect.

When the tomatoes leave the end of the peeler belt, the forward gap plate 127 guides the tomatoes as the transport belt 111 moves them to a point over the horizontal take-off belt 21 which is beyond the front end of the slider plate 13. The tomatoes are thereby deposited on the horizontal take-off belt which then removes them to further stations, such as a coring station, for example, for finishing operations.

From the foregoing description, it will be recognized that all machine components which contact the tomatoes directly or indirectly are readily removable for cleaning, or can be easily and quickly cleaned in place without any requirement of tools. The transport belts and the slitter knife are adjustable laterally to accommodate the range of diameters of tomatoes suitable for canning whole. Adjustments are quickly made without tools. The slitter makes a definite break in the skin of the tomato, uniformly located in the earth end thereof, and facilitating proper and consistent functioning of the peeler belt.

The variable speed drives for the belts permit adjustment of surface speeds in accordance with production rates and also to conform to characteristics of different types of tomatoes.

As an example of the capacity of a machine according to the present invention, tomatoes of average size (⅓ lb. and approximately 3 inches in diameter) can be processed at a rate of approximately 120 per minute.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A peeling machine comprising: a frame; an elongate support member mounted to said frame; a first endless belt having a transport portion moving horizontally parallel to said support member; a second endless belt having a transport portion facing a first part of the transport portion of said first belt and moving horizontally and generally parallel thereto and at the same speed as the transport portion of said first belt; the facing transport portions of said first and second belts having resilient facing material enfolding the article to be peeled and cooperating to move said article along said support member; a knife; means mounting said knife to said frame and accommodating movement of said knife transverse to the direction of movement of said article to be peeled, and restraining said knife from movement parallel to the direction of movement of said article, and disposing said knife above said support member to slit the peel of the article to be peeled as the article is moved by said first and second belts; a third endless belt having a stripping portion in horizontally spaced facing relation to a second part of the transport portion of said first belt and moving downwardly, said stripping portion being sufficiently close to the second part of the said transport portion of said first belt to engage the peel of the article and guide the article to keep it enfolded by the facing material of said second part of the transport portion of said first belt whereby said second part rolls said article on said stripper portion and said stripper portion removes the peel as the article is transported between said second part of the transport portion of said first belt and said stripping portion of said third belt by said second part of the transport portion of said first belt.

2. A machine as set forth in claim 1 wherein said knife has a blade with a cutting edge and limit means thereon and wherein said limit means include a shoulder secured to said blade and extending outwardly from said blade at a predetermined distance from said edge.

3. A peeling machine comprising: an elongate support member to receive articles to be peeled; first and second continuous transport belts having moving portions in facing spaced relation to engage an article to be peeled and said moving portions moving in the same direction to transport the article on said support member, all moving portions which are engageable with the article being costructed to avoid piercing the article; a continuous peeler belt having a portion facing part of the moving portion of said first belt and in spaced relation thereto to grip the article between said part of the first belt and said facing portion of said peeler belt whereby said part of the first belt moves the article in translation and rolls it on said facing portion of said peeler belt as the article is supported on said support member, the said facing portion of said peeler belt moving in a direction different from the direction of motion of the said part of the moving portion of said first belt faced by said facing portion of said peeler belt to exert a peel stripping force on the peel of the article as said part of said first belt moves the article between said part of said first belt and said facing portion of said peeler belt.

4. A peeling machine comprising:
means supporting an article to be peeled;
transfer means adjacent said supporting means and moving in translation for moving the article along said supporting means;
a peeler belt adjacent said supporting means and having a portion facing said transfer means and spaced therefrom to admit the said article between said transfer means and said facing portion of the peeler belt, said peeler belt facing portion forcing said article against said transfer means thereby enabling said transfer means to move said article in translation in said machine and roll said article on said facing portion of said peeler belt, said facing portion of said peeler belt engaging the exterior skin surface of the article and moving in a direction toward said supporting means to remove the skin as said transfer means moves the article along on said facing portion of said peeler belt.

5. A peeling machine comprising: a bed frame; a transfer belt support frame mounted to said bed frame and having a pair of vertically aligned slots in vertical spaced relation at one end and a pair of vertically aligned notches at the other end;
a first shaft mounted vertically in bearings mounted in said notches on said bed frame for rotation of said shaft;
a cylindrical roller secured to said shaft;
a second shaft extending vertically through said slots and parallel to said first shaft;
shaft support means engaging said belt support frame and said second shaft to vertically support said second shaft in said frame;
a cylindrical roller mounted to said second shaft through bearings;
a transfer belt encircling said rollers;
a hand lever pivotally mounted to said belt support frame;
a turnbuckle assembly connected between said hand lever and said second shaft, the connection to said hand lever being spaced from the pivotal axis thereof whereby movement of said hand lever about its pivotal axis changes the center-to-center distance between said shafts to facilitate tightening of said belt on said rollers and alternatively removal of said belt and rollers from said belt support frame; first and second upstanding supports mounted to said bed frame; upper and lower cylindrical rollers mounted to said supports in vertically spaced relation, said upper and lower rollers having parallel axes of rotation; and a peeler belt facing said transfer belt and supported by and encircling said upper and lower rollers, the entire peeler belt lying in horizontally spaced relation to an imaginary vertical plane and the entire transfer belt lying in horizontally spaced relation to said plane with said plane being disposed between said transfer belt and said peeler belt; whereby said transfer belt and rollers are readily removable from said support frame independent of said peeler belt.

6. In a peeling machine, peeler belt means comprising:
first and second upstanding supports;
a pivot arm having one end pivotally mounted at the upper end of one of said supports and having another end with a notch therein;
an upper cylindrical roller mounted for rotation on a horizontal shaft, said shaft having one end located in said notch;
a lower cylindrical roller mounted for rotation on a horizontal shaft mounted between said upstanding supports;
a belt encircling said rollers;
a hand lever pivotally mounted to said one support at an elevation below said pivot arm;
a turnbuckle assembly connected between said pivot arm and said hand lever and supporting the notched end of said pivot arm to support said one end of said shaft, the connection to said hand lever being offset with respect to its pivotal axis whereby said lever is effective to easily change the spacing of said rollers to facilitate tightening the belt and alternatively loosening the belt.

7. In a peeling machine, peeler belt means comprising:
first and second upstanding supports, said supports having slots therein, the slot in said first support being aligned with the slot in said second support;
bearings mounted in the said slots;
a cylindrical roller supported in said bearings for rotation about an axis through said bearings;
a lever pivotally mounted to at least one of said supports and movable to a position retaining a bearing in a slot;
and a releasable latch holding said lever in said bearing retaining position.

References Cited in the file of this patent
UNITED STATES PATENTS

| | | |
|---|---|---|
| 1,023,700 | Williams et al. | Apr. 16, 1912 |
| 1,312,332 | Kirino | Aug. 5, 1919 |
| 1,992,995 | Denner et al. | Mar. 5, 1935 |
| 2,831,516 | Buck | Apr. 22, 1958 |
| 2,862,535 | Wilson et al. | Dec. 2, 1958 |
| 3,058,502 | Loveland et al. | Oct. 16, 1962 |